United States Patent [19]

Atchley et al.

[11] 4,406,253
[45] * Sep. 27, 1983

[54] ANIMAL BITE VALVE

[75] Inventors: Frank W. Atchley; Donald W. Vorbeck; Ronald L. Wurz, all of Napa, Calif.

[73] Assignee: Atco Manufacturing Co. Inc., Napa, Calif.

[*] Notice: The portion of the term of this patent subsequent to Jul. 13, 1999 has been disclaimed.

[21] Appl. No.: 322,073

[22] Filed: Nov. 16, 1981

[51] Int. Cl.³ .............................................. A01K 7/06
[52] U.S. Cl. ..................................... 119/72.5; 119/75
[58] Field of Search ................................ 119/72.5, 75

[56] References Cited

U.S. PATENT DOCUMENTS

| 1,698,961 | 1/1929 | Mueller | 251/166 |
|---|---|---|---|
| 2,710,594 | 6/1955 | Thompson | 119/72.5 |
| 2,939,424 | 6/1960 | Frederiksen | 119/72.5 |
| 2,939,424 | 6/1960 | Frederiksen | 119/72.5 |
| 3,132,774 | 5/1964 | Soffer | 222/394 |
| 3,289,635 | 12/1966 | Eagles | 119/72.5 |
| 3,611,999 | 10/1971 | Hey | 119/72.5 |
| 3,613,642 | 10/1971 | Restall | 119/75 |
| 3,646,955 | 3/1972 | Olde | 137/382 |
| 3,698,431 | 10/1972 | Thompson | 137/604 |
| 3,734,063 | 5/1973 | Atchley | 119/72.5 |
| 3,800,825 | 4/1974 | Zoll | 119/72.5 |
| 3,874,343 | 4/1975 | Niki | 119/72.5 |
| 4,006,716 | 2/1977 | Cross | 119/72.5 |
| 4,338,884 | 7/1982 | Atchley et al. | 119/72.5 |

FOREIGN PATENT DOCUMENTS

| 1016506 | 4/1950 | France | 119/72.5 |
|---|---|---|---|
| 1120351 | 3/1955 | France | 119/72.5 |
| 51-144485 | 11/1976 | Japan | 119/72.5 |
| 774904 | 3/1954 | United Kingdom | 119/72.5 |
| 957300 | 12/1980 | United Kingdom | 119/72.5 |
| 437506 | 12/1969 | U.S.S.R. | 119/72.5 |

OTHER PUBLICATIONS

Serial No. 6/241,645, Filed: Mar. 9, 1981, Animal Bite Valve, Atchley et al.

Primary Examiner—Hugh R. Chamblee
Attorney, Agent, or Firm—James R. Cypher

[57] ABSTRACT

An animal bite valve for dispensing water on demand which is formed with a lever operated by the animal. The valve is opened by either pushing the valve inwardly longitudinally or by tilting. The lever is formed with an annular non-flexible flange which bears against a non-flexible annular land as a fulcrum. Sealing is effected by a flexible cup seal which rests upon a valve seat and is lifted therefrom by the tilting of the valve member.

A spring retainer member mounted on the lever downstream of the valve seat is formed with a slotted disc which disrupts the stream flow and deflects the flow outwardly toward the inside wall of the housing, which function serves to restrict, limit, and control the flow discharge velocity.

A baffle inserted in the downstream flow portion of the housing, formed with a plurality of pockets causes further water turbulence and further reduction in fluid flow velocity and directs the water into the mouth of the animal.

A contoured housing in the downstream end permits easy valve actuation by the animal.

6 Claims, 7 Drawing Figures

ANIMAL BITE VALVE

BACKGROUND OF THE INVENTION

This invention relates to a water valve which is operable by pigs, sheep, dogs and primates, and is an improvement of our bite valve disclosed in pending application U.S. Ser. No. 241,645 filed Mar. 9, 1981. While the operation of the cup seal exceeded expectations, the direct flow through the valve was excessive when high water pressure was present and younger animals were to be watered.

The present valve like all prior art valves is operated by the animal biting and tilting an elongated lever causing water to flow. All prior bite valves with the exception of our prior application, have a serious valve seat problem. A spring usually forces a metal flange against a flexible seal and in time, the elastic seal compresses permitting leakage or restricting flow. Examples of valves which are operable by a tilting lever with a metal flange forming a mechanical compression seal against a flexible compressible seat are as follows:

| PAT. NO.: | GRANT DATE: | INVENTOR: |
|---|---|---|
| 1,698,961** | Jan. 15, 1929 | R. Mueller |
| 2,710,594** | June 14, 1955 | E. C. Thompson |
| 2,939,424* | June 7, 1960 | R. O. Frederiksen |
| 3,132,774 | May 12, 1964 | J. W. Soffer |
| 3,289,635 | Dec. 6, 1966 | R. P. Eagles |
| 3,611,999 | Oct. 12, 1971 | John S. Hey |
| 3,613,642 | Oct. 19, 1971 | George Restall |
| 3,646,955** | March 9, 1972 | Jarl R. Olde |
| 3,698,431** | Oct. 17, 1972 | Earl C. Thompson |
| 3,734,063** | May 22, 1973 | Frank W. Atchley |
| 3,800,825* | April 2, 1974 | Andre Zoll |
| 3,874,343 | April 1, 1975 | Motohiro Niki |
| 4,006,716* | Feb. 8, 1977 | David L. Cross |
| Ser. No. 06/241,645 | Filed: March 9, 1981 | Atchley et al |

| PAT. NO.: | GRANT DATE: | COUNTRY: |
|---|---|---|
| 437,506 | Dec. 9, 1969 | USSR |
| 144,485 | Nov. 29, 1976 | Japan |
| 1,016,506 | April 20, 1950 | France |
| 1,120,351 | March 7, 1955 | France |
| 774,904 | March 30, 1954 | Great Britain |
| 957,300 | Dec. 1, 1980 | Great Britain |

Patents designated by a single asterisk (*) are constructed with springs located downstream of the valve seat. Patents designated by a double asterisk (**) are constructed with springs located upstream of the valve seat.

SUMMARY OF INVENTION

The present invention has the same unique cup seal as described in our previous application, but in addition, by relocating the spring and a special spring retainer formed as a deflector disc downstream of the valve seat we were able to cause the water to dribble out rather than shooting straight out into the animals's mouth. Thus with our new relocated combination of spring retainer-deflector and redesigned baffle, we were able to achieve the following special features.

a. A metal-to-solid contact at the fulcrum point provides non-compressible, non-wearing positive assured valve actuation.

b. The absence of a metal lever in compression with an elastic seal and provision of a flexible line seal permits drip free operation at water pressures from 0.25 psi up to 100 psi, and water flow is not reduced due to compression of O-ring seals.

c. The metal-to-solid contact provides increased tilt action allowing greater water flow where water pressure is low.

d. A special elastic cup seal lifts upward against the direction of water flow providing improved flushing and decreased problems of sand and/or silt entrapment.

e. The cup seal provides a good seal via elastic movement under water pressure. The cup seal is dimensioned so that elastic limits are not exceeded and the controlled compression insures that the seals do not deform, extrude or cold flow under uncontrolled pressure, thereby vastly extending the life of the elastic seal.

f. The seal member is mechanically attached to the valve lever head eliminating bonding, vulcanzing, or gluing techniques. Attachment of the seal is more assured and less expensive than other techniques.

g. Gentle water delivery is effected by the combined action of a close-coiled cone shaped spring and a perpendicular circular disc spring retainer which is formed with a slotted disc which disrupts the water flow and deflects it outwardly to the housing walls and a further downstream baffle which creates water turbulence within the valve housing and transmits the water directly into the mouth of the animal in a soft gentle flow.

h. The valve may be quickly and easily assembled.

i. Positioning the valve components such as the spring in the water stream helps to flush and clean it.

j. The valve may be opened by the animal pushing directly against the end of the valve lever. Movement of the valve lever and cup seal against the direction of water flow assists in flushing the valve seat of any entrapped sand or other particles in the water supply.

DESCRIPTION OF THE PREFERRED EMODIMENTS

Figure 1:
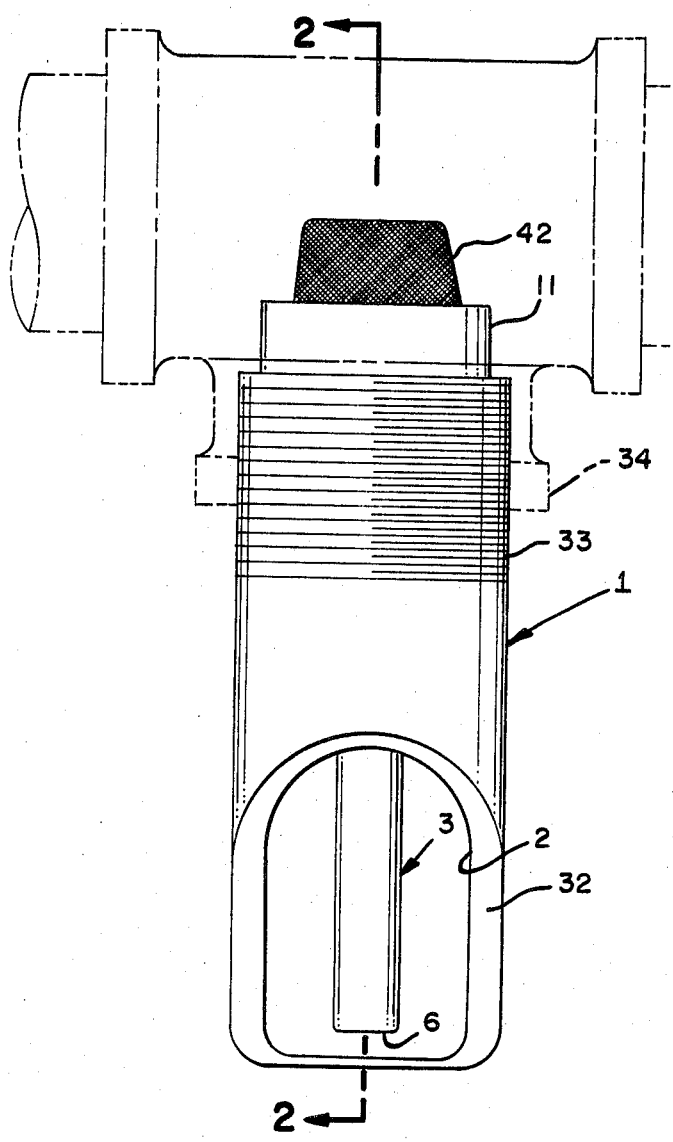
FIG. 1 is a top plan view of the valve member with portions of the manifold pipe in phantom line.

The animal bite valve of the present invention consists briefly of a housing 1, formed with an opening 2 therethrough; a non-flexible fulcrum means mounted within the housing; an elongated valve lever 3 mounted in the housing and having an inner head end 4 and a distal end 6, and having an inflexible flange 7 positioned for tilting registration with the non-flexible fulcrum means; a valve seat means mounted in the housing; and including a spring abutment 5 downstream of the seat; a flexible cup seal member 8 mounted on the lever for tilting movement therewith and for sealing and unsealing engagement with the valve seat; a spring retainer 10 mounted on the lever downstream of the valve seat; and biasing means mounted on the valve lever between the spring stop 5 and the spring retainer biasing the inflexible flange on the valve lever into engagement with the non-flexible fulcrum means.

The non-flexible fulcrum means and the valve seat means may consist of separate structures but preferable are a single annular land 9. This annular land may be formed in the wall of the housing, but preferably it is formed in an insert 11 dimensioned for receipt with the housing. The insert is formed with an opening 12 for receiving the valve lever therethrough.

The spring retainer member 10 includes an annular disc 15 surrounding the lever and extends radially therefrom so as to intercept and deflect fluid toward the inner walls 21 of the housing and a central opening 25 for registering receipt upon the lever. The spring retainer 10, spring 14, and valve lever are positioned to permit axial reciprocation of the valve lever as well as tilting movement upon engagement of the distal end of the valve lever by an animal.

The valve lever downstream of the flange is formed with a substantially constant cross section and is formed with an annular channel 35 and shoulder 48 for retaining the spring retainer.

The cup seal member 8 is formed with a base 17 which is retained by the side walls 18 and 19 of annular groove 20 formed in the valve lever member.

The opening in the insert for receiving the valve lever therethrough is formed with a flared portion 22 which permits tilting of the lever.

A baffle member 23 having a peripheral annular wall 24 may be placed in sealing registration with the inside wall of the housing and is positioned downstream of the spring retainer. The baffle has an opening 26 for passage of the lever member and for directing water therethrough. The baffle is held by friction and by reaming the inside wall of the housing leaving a shoulder 29 against which wall 49 of the baffle abuts.

Preferably the opening in the baffle member is formed with an upstream facing flange 27, a downsteam wall 49 formed with an opening 26 which increases in area as it approaches the annular wall and a plurality of web members 50 radiating from the opening and terminating in the flange forming a plurality of pockets 51 to provide a swirling action to the water passing therethrough for creating a turbulent backflow within the housing.

The insert 11 is formed from plastic with a perimeter wall formed with external threads 36 in registration with internal threads 52 formed in the inside wall of the housing.

Figure 2:
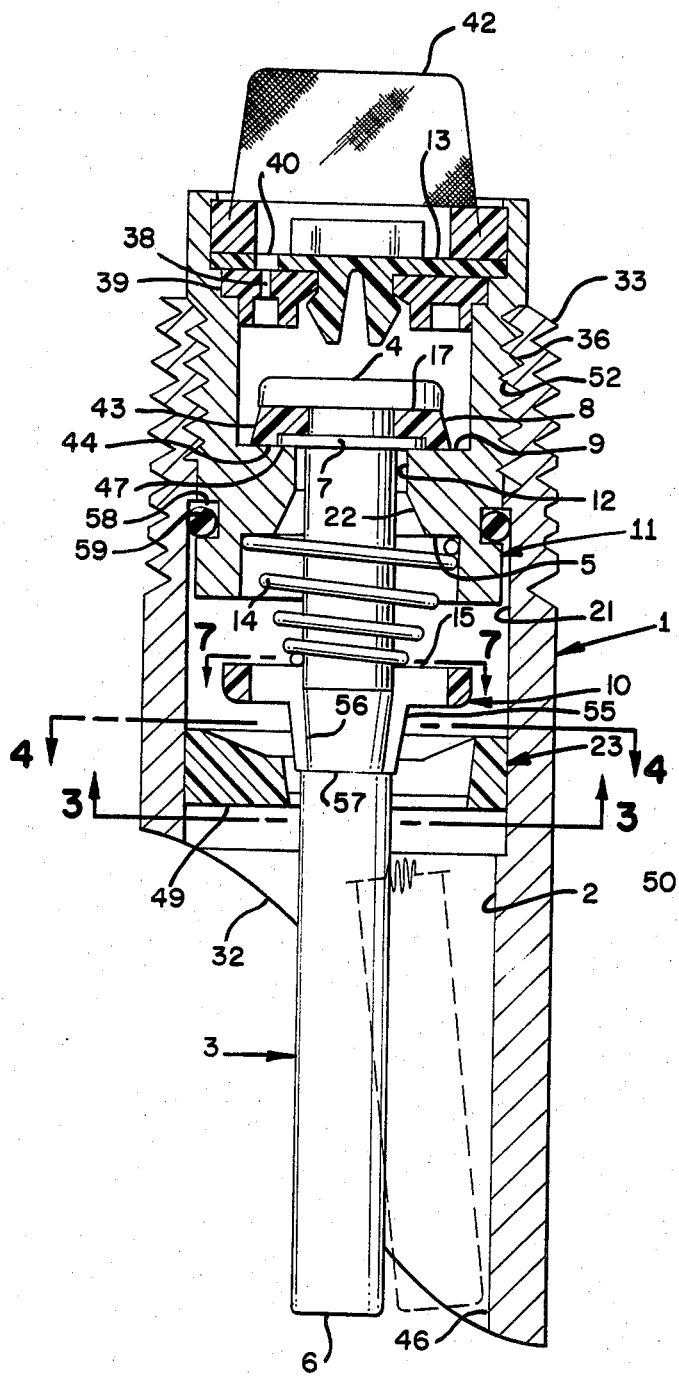
FIG. 2 is a cross sectional view of the valve shown in FIG. 1 taken along line 2—2 with a portion of the lever shown in phantom line in the valve actuated position.
Figure 3:
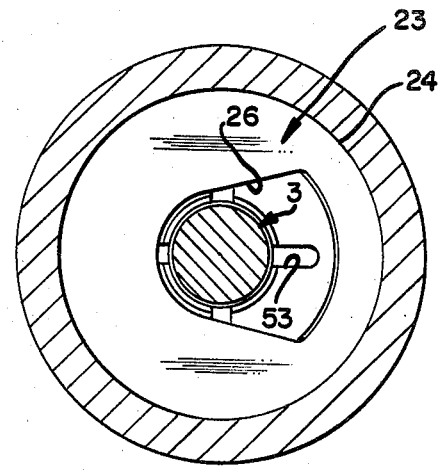
FIG. 3 is a cross sectional view of a portion of the valve shown in FIG. 2 taken along line 3—3 of FIG. 2.
Figure 4:
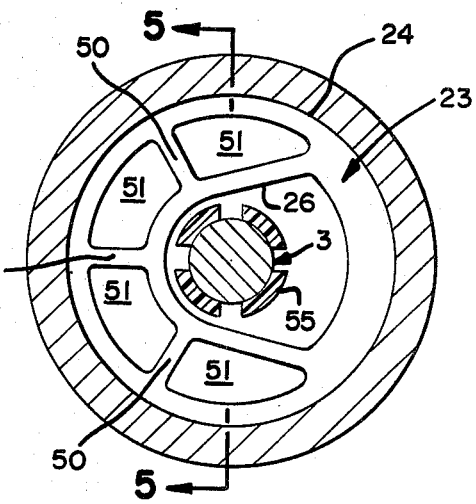
FIG. 4 is a cross sectional view of the valve shown in FIG. 2 taken along line 4—4.
Figure 5:
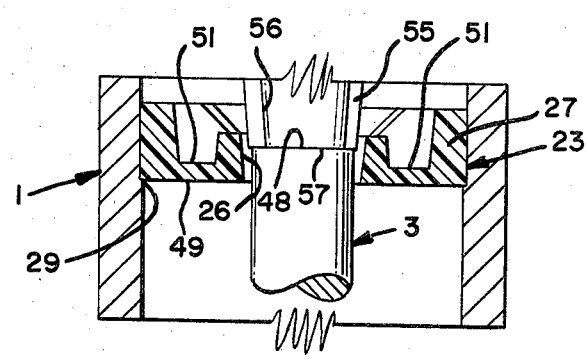
FIG. 5 is a cross sectional view of a portion of the valve shown in FIG. 4 taken along line 5—5.

As shown in FIGS. 1 and 2 insert 11 protrudes from the inner end of the housing so that a substantial portion is adapted to project into a manifold water supply pipe 31 to assist in the avoidance of freezing of the valve when subject to freezing temperatures.

The disc portion of the spring retainer is formed with a plurality of cicumferentially spaced slotted openings 53 radiating from the central opening creating a plurality of flexible segments 54. The flexible segments permit forced mounting of the spring retainer on the lever and snap fit interlocking with the annular groove in the valve lever.

The detailed construction and assembly of the valve of the present invention is as follows. Housing 1 is preferably made from metal with a cutout portion 32 which permits the animal to bite the lever 3. Note that the lever is placed within the housing which acts as a guard for the lever. The housing is formed with external pipe threads 33 to permit the valve to be threadably attached to the supply pipe with internal threads in a T-section 34; or other pipe fittings.

The adjustable water flow regulator 13 is formed with at least one opening 40 therethrough for the passage of water. This opening registers with at least one opening 38 in a water flow control member 39 as shown in FIG. 2.

A screen 42 retained by insert 11 filters the water flowing through the valve.

The spring retainer 10 is formed with a hub section 55 extending downstream from the annular disc 15 with an opening 25 therethrough. The annular groove 35 formed in the valve lever is formed with a taper so that the downstream end of the groove terminates at a shoulder 48 and the hub section of the spring retainer is formed with a taper 56 for friction fit registration with the tapered groove in the valve lever and the nose 57 of the spring retainer hub mechanically interlocks with the shoulder on the lever.

The housing in the downstream portion is constructed with a contoured cutout 32 consisting of a reverse compound curve exposing a substantial portion of the lever for activation by an animal biting on the downstream end of the housing and the lever.

OPERATION OF THE VALVE

FIGS. 1 and 2 show the valve in the normally closed position. Spring 14 bearing against spring stop 5 of the insert and spring retainer 10 and causes annular non-flexible flange 7 to rest upon non-flexible land 9 of insert 11. Flexible cup seal 8 is in sealing engagement with the valve seat which in the valve illustrated is annular land 9. The cup seal may be made from a material sold under the trademark Viton owned by Dupont de Nemours, Inc. As shown in detail in FIG. 2, the cup seal is formed with a downwardly facing annular wall 43 which terminates in a flexible sealing edge 44. Note that water pressure on the supply side of the cup seal assists in the water seal by forcing sealing edge 44 in close fitting engagement with non-flexible land 9 of insert 11. There is a uniform pressure exerted by the mechanical holding of the cup seal within the annular groove in the lever member. This unifom pressure is governed by the initial dimensions of the parts rather than by any operation of the valve. The force exerted by spring 14 exerts a minimal force upon the cup seal 8. The main biasing energy of the spring causes the metal to solid-compression contact between metal flange 7 on inflexible annular land 9.

When the animal depresses the end 6 of the lever toward or against the inside wall 46 of the housing as shown in FIG. 2, the inside wall acts as a stop and the lever tilts on the inflexible fulcrum point which in the illustrations is the inflexible flange 7. The flange tilts upon a point 47 on the rim of the inflexible flange 7. By tilting on the inflexible rim of flange 7, there is little additional compressive force exerted on the sealing edge 44 of the annular wall 43 of the cup seal. There is merely a slight distortion of the sealing edge 44. The opposite side of the cup seal is actually lifted off the annular land 9 against the flow of the water and against the water pressure to permit the flow of water between the raised cup seal and the annular land 9. When the animal releases the end of the lever, the spring 14 returns the lever to the sealed position and stops the flow of water. When the valve is in the closed position, flange 44 flares outwardly and forms approximately an 81° angle rather than a 90° angle.

Since the opening and closing of the valve consists of a tilting of the valve member on a metal or solid to inflexible member contact, there is very little compression of the cup seal and therefore the life of the flexible seal is much longer. There is little wear occurring on the cup seal and little compression distortion of the flexible cup seal to cause leakage. This unique construction permits functional operation up to 100 psi.

As previously stated, a substantial portion of the internal parts of the valve member are located within the supply pipe. This assists in the prevention of freezing of the valve in freezing temperatures.

Figure 6:
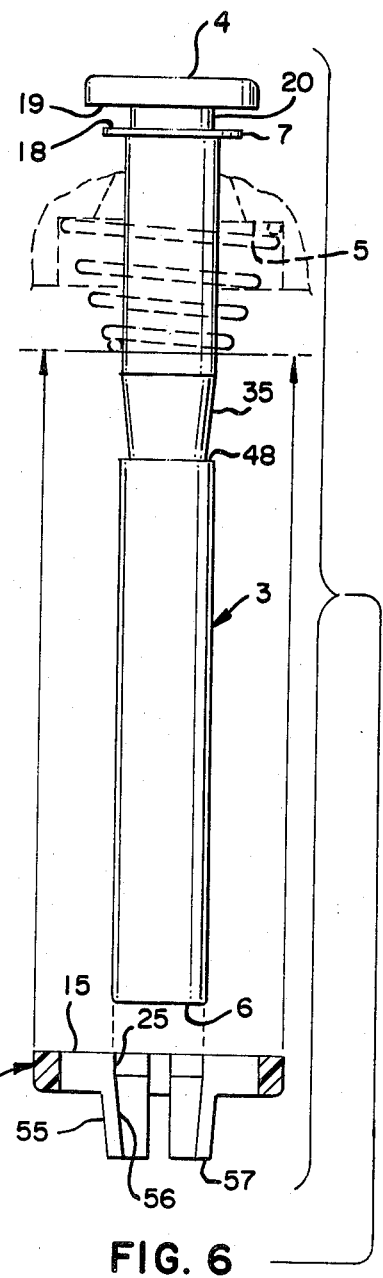
FIG. 6 is an enlarged exploded view of a portion of the device shown in FIG. 2 to illustrate the steps for assembling a portion of the valve.
Figure 7:
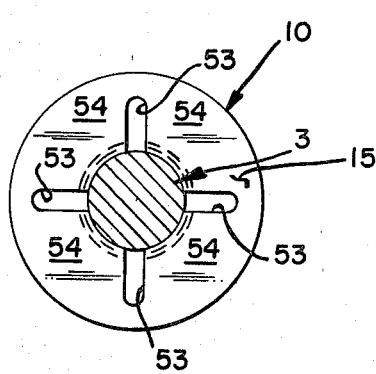
FIG. 7 is a cross sectional view of a portion of the valve shown in FIG. 2 taken generally along line 7—7.

Turbulence and reduced velocity of the water is effected by the combination of the close-coiled cone spring 14 spring retainer 10 and baffle 23. As the water flows through the small opening 12 into the flared opening 22, it loses velocity from pressure decrease and increase in cross sectional area and then strikes the disc wall of the spring retainer. Only a small portion flows through the slots 53 in the spring retainer. Most of the water flow is deflected outwardly from the retainer and strikes the walls of the housing. A substantial portion of the water then strikes the pockets 51 in the baffle 23 and additional turbulence is induced in the flow. Thus, there is practically no direct discharge flow through the valve. Substantially all of the water is either deflected by either the spring retainer or the baffle or subject to turbulence. As shown in FIG. 6, the opening 26 in the baffle may be generally triangular shape.

The baffle 23 not only channels the flow of water into the animals mouth but assists in preventing food and debris from being forced back into the working parts of the valve.

Insert 11 is formed with an annular groove 58. O-ring 59 is dimensioned for receipt in groove 48 to provide sealing.

To assemble the valve, lever 3 is inserted through opening 12 in insert 11. Spring 14 is then placed on the lever from end 6. Spring retainer 10 is then inserted on lever 3 from end 6 until it snaps into position with nose 57 in engagement with shoulder 48. Baffle 23 is then inserted into the housing from the upstream end until wall 49 engages shoulder 29. The preassembled lever and insert is then threaded into the upstream end of the housing.

We claim:

1. An animal bite valve comprising:
   a. a housing formed with an opening therethrough;
   b. non-flexible fulcrum means mounted within said housing;
   c. an elongated valve lever mounted in said housing having an inner end and a distal end, and having an inflexible flange positioned for tilting registration with said non-flexible fulcrum means;
   d. valve seat means mounted in said housing and including a spring stop downstream of said seat means;
   e. a flexible cup seal member mounted on said lever for tilting movement therewith and for sealing and unsealing engagement with said valve seat means;
   f. spring retainer means mounted on said lever downstream of said valve seat means;
   g. biasing means mounted on said valve lever between said spring stop and said spring retainer means biasing said inflexible flange on said valve lever into engagement with said non-flexible fulcrum means;
   h. said non-flexible fulcrum means and said valve seat means both consist of a single annular land;
   i. said spring retainer means includes an annular disc surrounding said lever and extending radially therefrom so as to intercept and deflect fluid toward said inner walls of said housing and a central opening for registering receipt upon said lever;
   j. said non-flexible fulcrum means and said valve seat means includes an insert dimensioned for receipt within said housing and is formed with an opening for receiving said valve lever therethrough and is formed to provide said annular land;
   k. said valve lever downstream of said flange is formed with a substantially constant cross section and is formed with an annular chanel and shoulder for retaining said spring retainer;
   l. said valve lever is formed with an annular groove adjacent its upstream end;
   m. said cup seal member is formed with a base retained by the side walls of said groove; and
   n. said housing is formed with thin walls having a generally constant diameter central bore.

2. A valve as described in claim 1 comprising:
   a. said opening in said insert for receiving said valve lever therethrough is formed with a flared portion permitting tilting of said lever; and
   b. a baffle member formed with a peripheral annual wall dimensioned for registration with the inner wall of said housing and positioned downstream of said spring retainer means; and
   c. said baffle member annular wall is formed with an upstream facing flange, a downstream wall formed with an opening increasing in area as it approaches said annular wall and a plurality of web members radiating from said opening and terminating in said flange forming a plurality of pockets creating a turbulent back flow within said housing.

3. A valve as described in claim 2 wherein:
   a. said disc portion of said spring retainer means is formed with a plurality of circumferentially spaced slotted openings radiating from said central opening creating a plurality of flexible segments; and
   b. said flexible segments permitting forced mounting of said spring retainer on said lever and snap interlocking with said annular groove in said valve lever.

4. A valve as described in claim 3 comprising:
   a. said housing is formed with internal threads in its upstream end; and
   b. said insert is formed from plastic and external threads for threaded receipt within said internally threaded housing.

5. A valve as described in claim 4 comprising:
   a. said spring retainer is formed with a hub section extending downstream from said annular disc with an opening therethrough;
   b. said annular groove formed in said valve lever is formed with a taper so that the downstream end of said groove terminates at a shoulder; and
   c. said hub section of said spring retainer is formed with a taper for friction fit registration with said tapered groove in said lever; and
   d. said nose of said spring retainer hub mechanically interlocks with said shoulder on said lever.

6. A valve as described in claim 5 comprising:
   a. said housing in said downstream portion is constructed so that a reverse compound curve is formed exposing a substantial portion of said lever for activation for an animal biting on said downstream end of said housing and said lever.

* * * * *